April 23, 1968  J. VERVLOET  3,378,977
DISMOUNTABLE PARTITIONS, PANELS AND SPECIAL
SECTIONS APPLIED TO THIS END
Filed Sept. 21, 1964

INVENTOR.
J. Vervloet
BY
Richards & Geier
ATTORNEYS

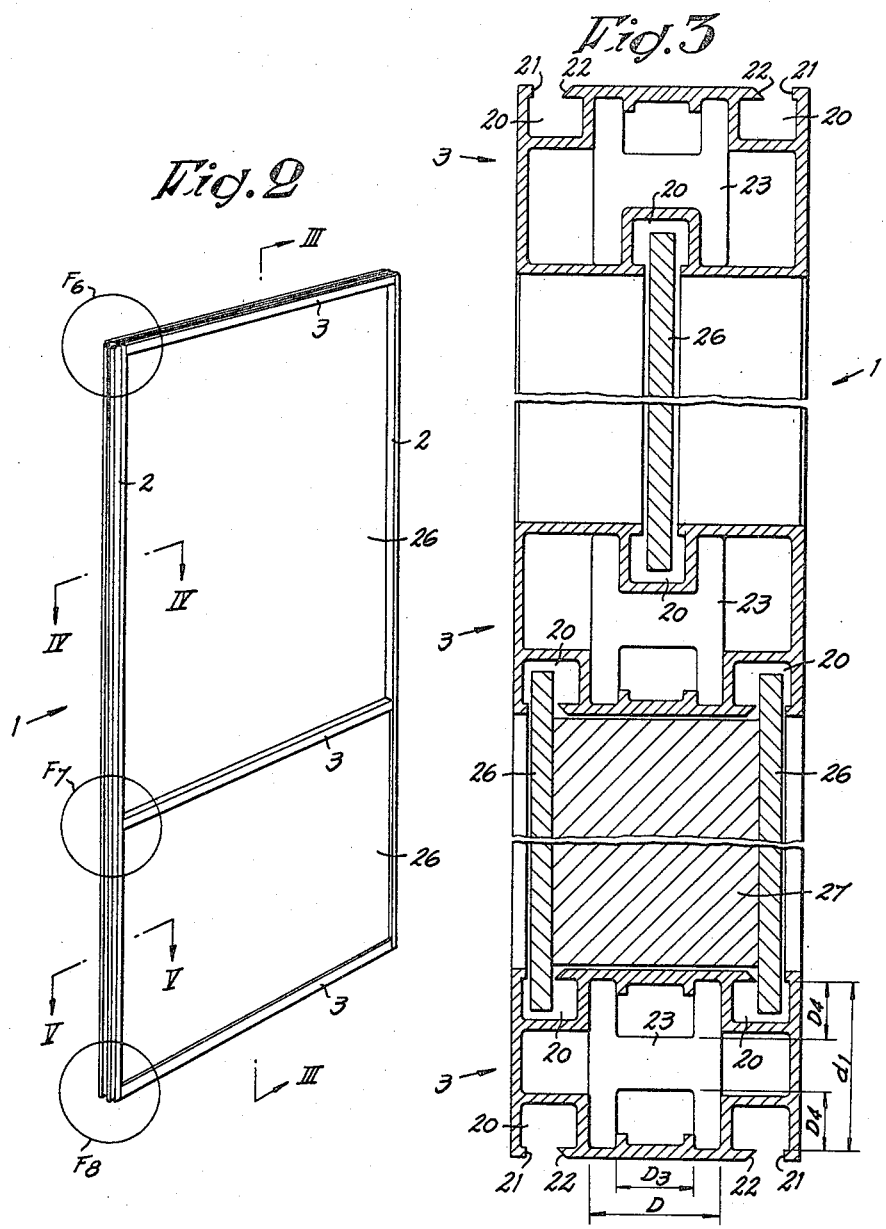

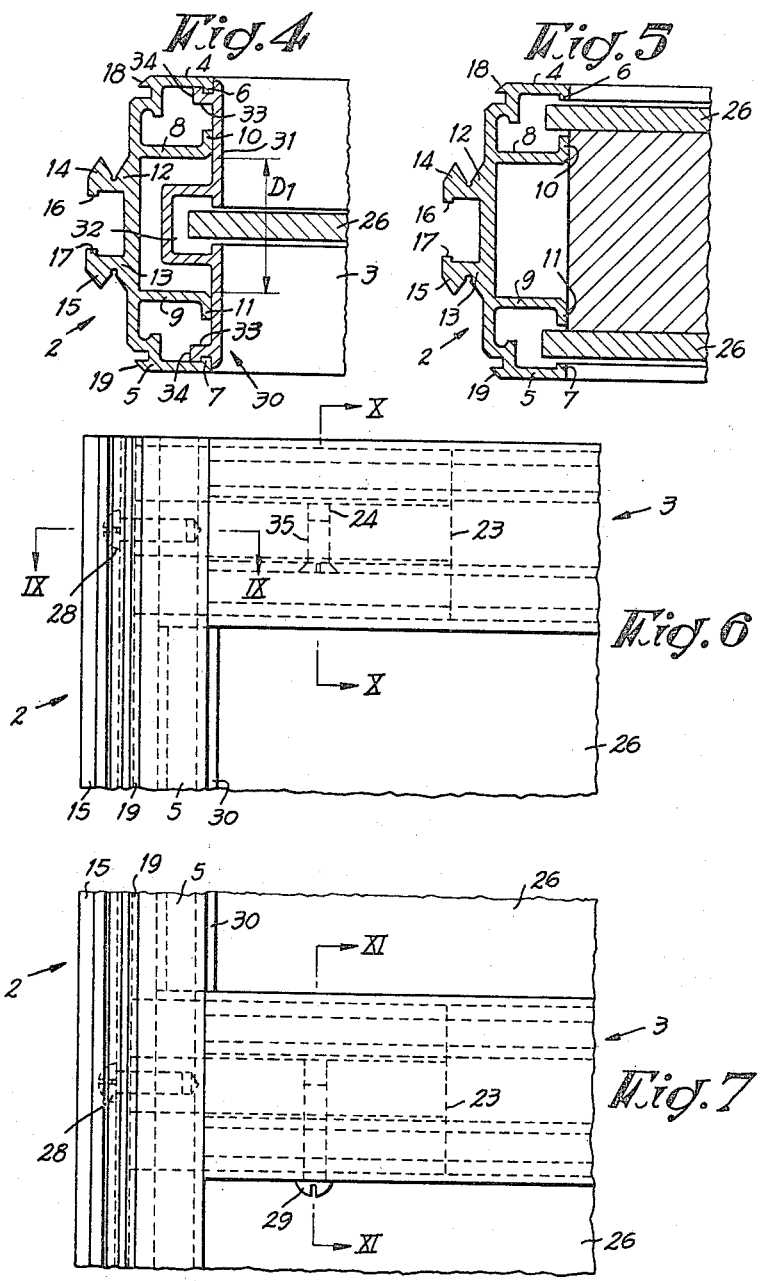

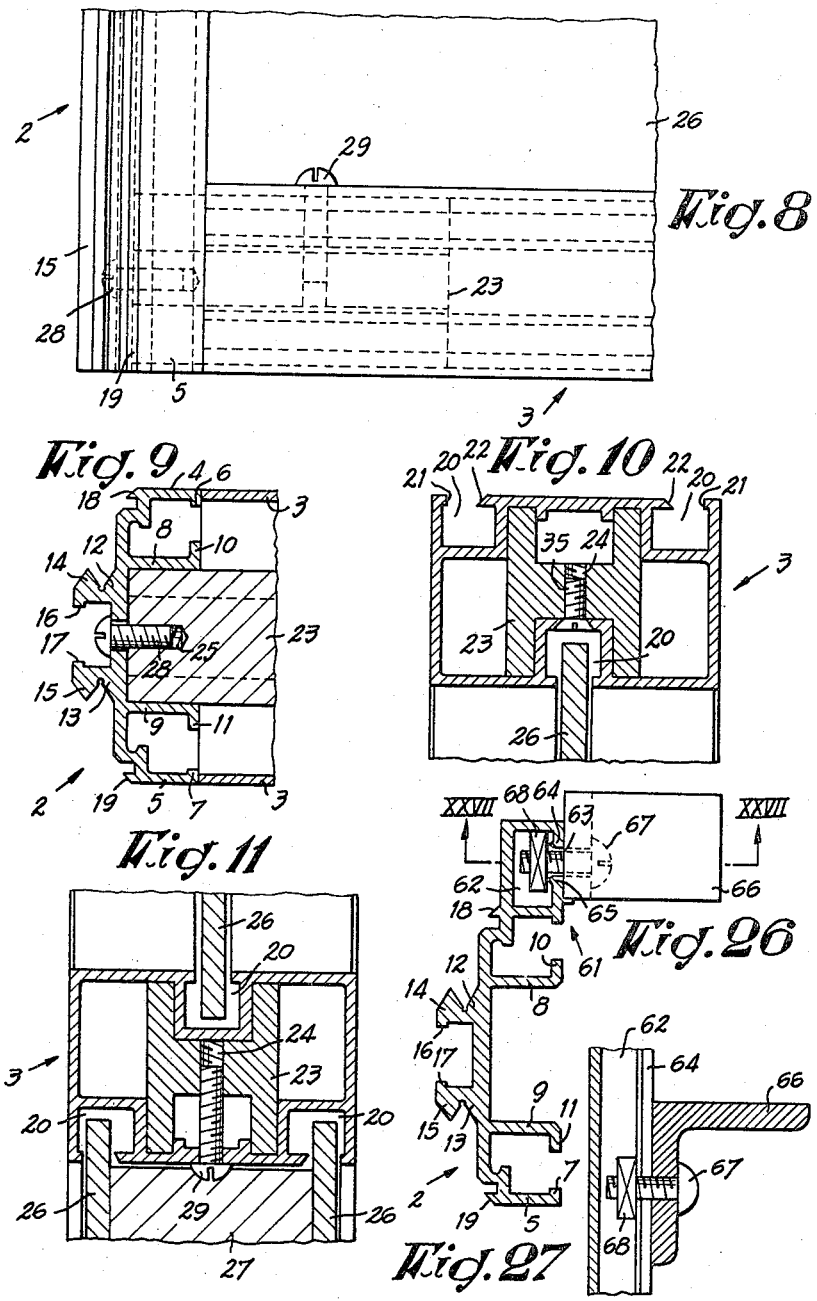

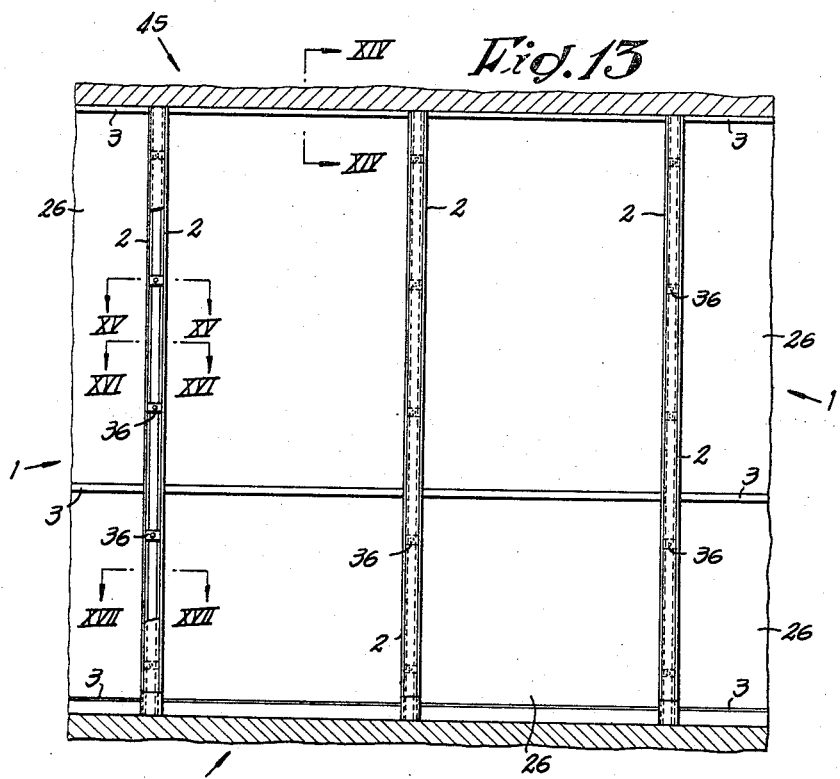
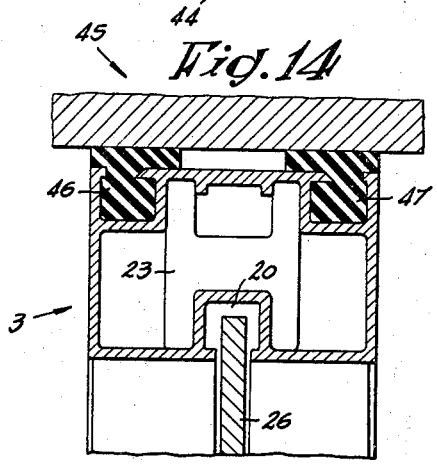
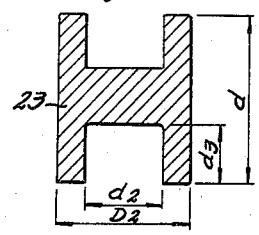
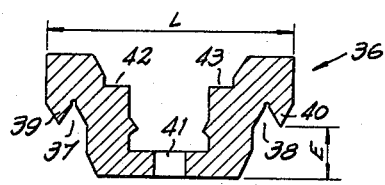
INVENTOR.
J. Vervloet
BY
Richards & Geier
ATTORNEYS April 23, 1968   J. VERVLOET   3,378,977
DISMOUNTABLE PARTITIONS, PANELS AND SPECIAL
SECTIONS APPLIED TO THIS END
Filed Sept. 21, 1964   9 Sheets-Sheet 6
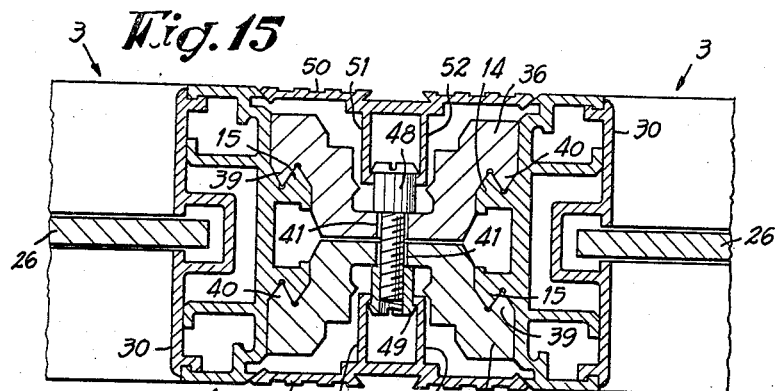
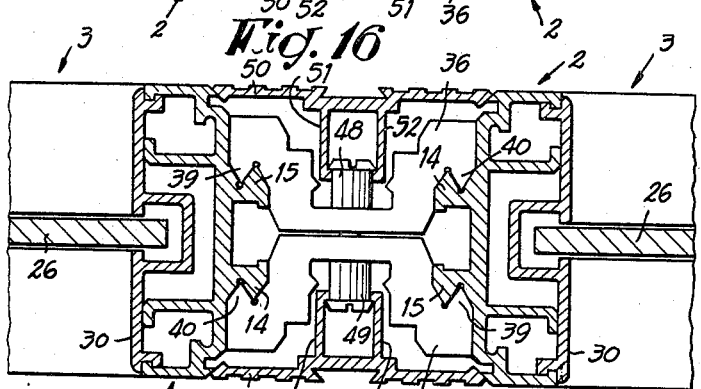
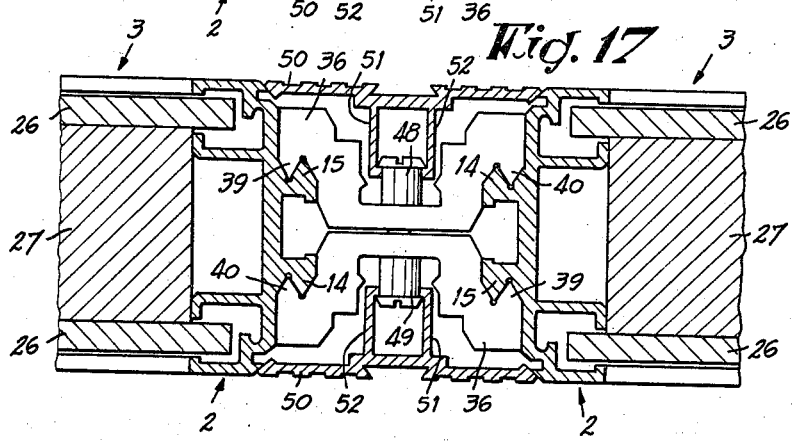
INVENTOR.
J. Vervloet
BY
Richards & Geier
ATTORNEYS

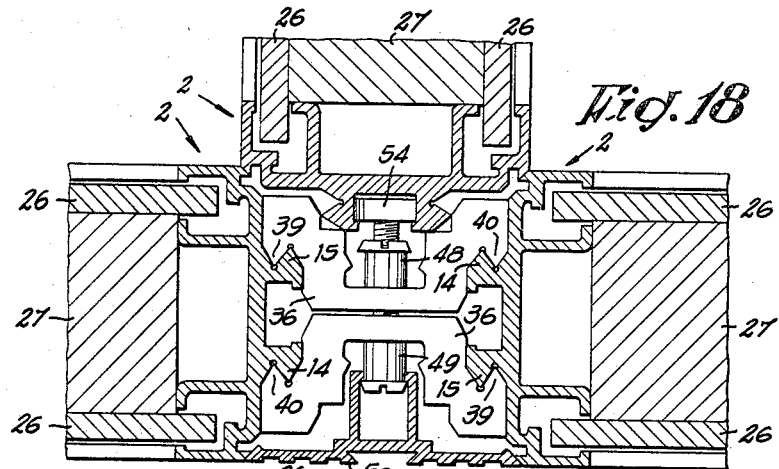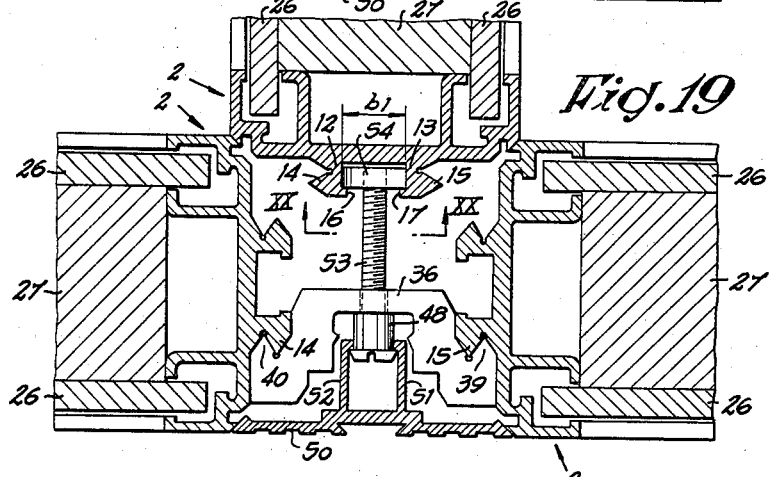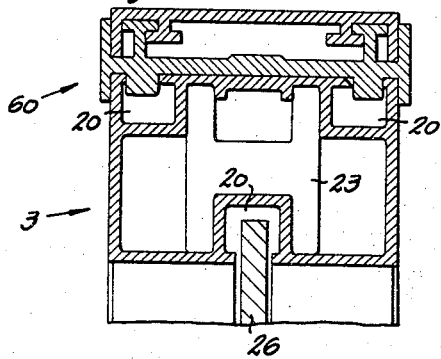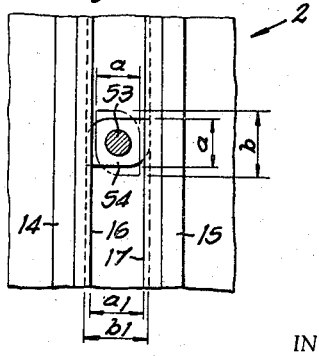

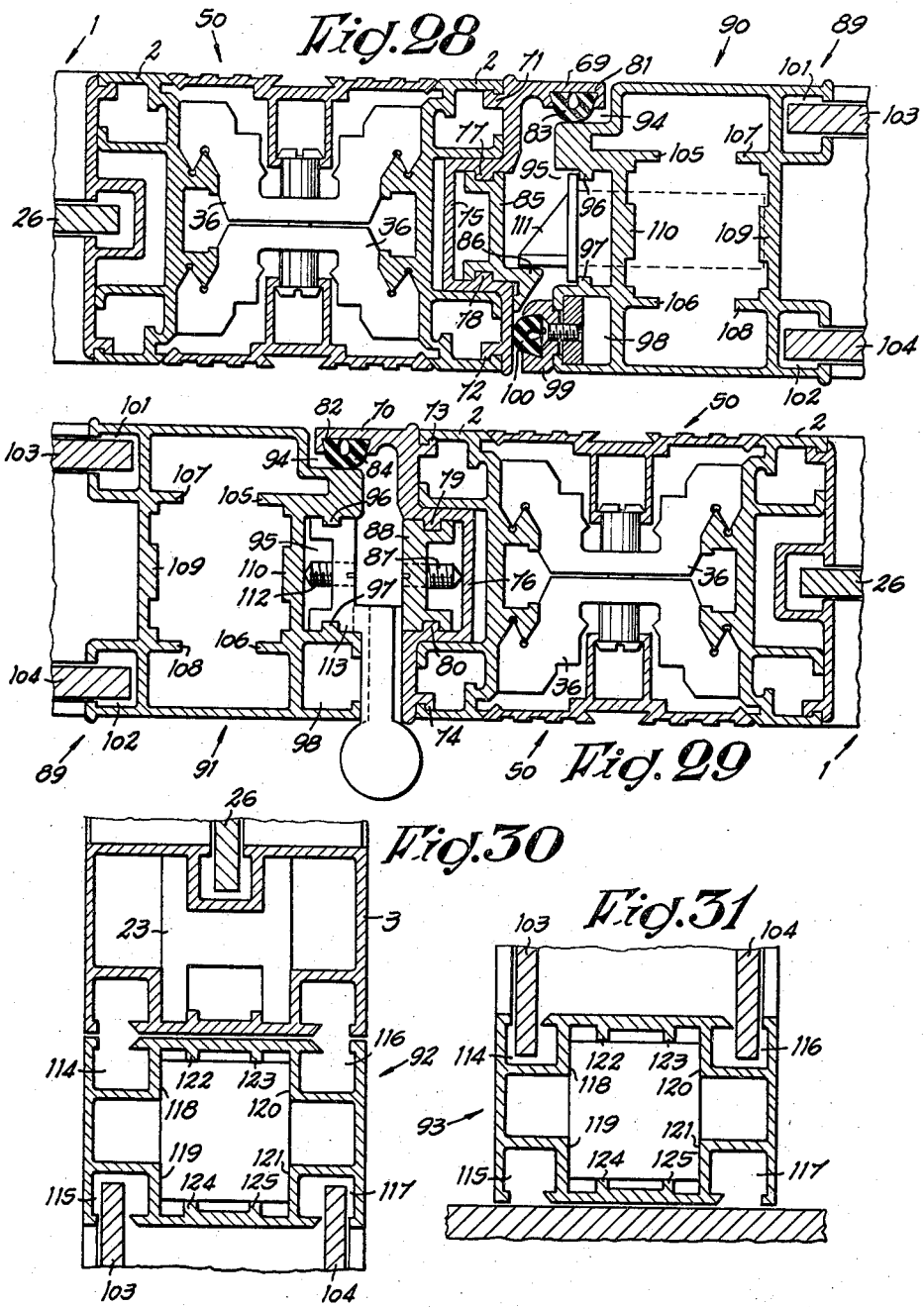

United States Patent Office 3,378,977
Patented Apr. 23, 1968

3,378,977
DISMOUNTABLE PARTITIONS, PANELS AND SPECIAL SECTIONS APPLIED TO THIS END
Jean Vervloet, 9 Ave. Bois du Dimanche,
Brussels, Belgium
Filed Sept. 21, 1964, Ser. No. 397,920
Claims priority, application Belgium, Sept. 24, 1963,
637,777; Aug. 18, 1964, 651,937
12 Claims. (Cl. 52—584)

The present invention concerns a novel technique of very wide scope, by means of which it is possible, by using a limited number of identical sections, combined together, fastened, connected or assembled, to build a basic structure of static appearance but nevertheless easy to take to pieces, to transform and to transpose, for dividing partitions as well as for an unlimited range of elements completing an inside administrative of other kind of installation, such as cupboards, office furniture, counters and the like. Such complementary elements designed by the same inventive conception (or by the same technique) can therefore not only be constructed separately but also be connected directly to the dividing partition, become integral with the latter and thus share all its features and its remarkable mobility.

All these complementary elements may thus be considered as partitions built on a usually smaller scale. Their connection and assembly systems are absolutely identical and these elements only vary, if the case arises, by the method of filling their structure and by their intended purpose.

In the present invention, the word "partition" must therefore be considered in a very wide sense and refers not only to an actual partition as such, but also to any element built by partitioning and able to form with the actual partition a useful and nice-looking whole.

The present invention thus applies to the construction of any kind of partitions of any sizes whatever and combining between them all kinds of single or double thickness walls making use of transparent, translucent or opaque elements and conditioned in such way as to make it possible to readily adapt to them any kind of opening element and also so as to make it possible to apply and/or fasten thereto ony loose elements as mentioned above, whereby the latter may be fitted for their finishing and filling, apart from the single or double thickness walls, with covering sills, swinging or sliding doors, drawers, shelves, and the like.

So, in a general way, the dismountable partitions according to the present invention are quite universal on account of the fact that they make it possible, in a room of any shape and size whatever, to effect the necessary subdivision in a way which is duly adapted to the nature of the construction and with a minimum of different sections.

A first object of the present invention concerns the fact as such, that, contrary to common practice, no use is made of a resilient supporting structure generally consisting of uprights and cross-pieces or beams, but only of special panels and of means for connecting such panels to one another. These panels are characterized by the fact that their two marginal edges are shaped in such a way that they make a constituent part of the supporting structure which will be built by assembling these panels conditioned in this way.

Another object of the present invention concerns the conditioning of aforesaid marginal sections in order to construct at will panels which are either totally or partly, of single or double thickness.

Another object of the present invention concerns the means of assembly of such adjacent panels disposed either in the same plane or in planes at right angles, these fastening elements co-operating for the formation, in the assembled partitions, of an actual resistant structure with very high moment of inertia.

Still another object of the present invention concerns the special sections used as joint-covers and able to complete the caisson disposition of aforesaid elements of the resisting structure in such a way that almost the same means are made use of for fastening together two partitions disposed in the same plane, two partitions forming a corner, three partitions forming a T or even four partitions disposed crosswise.

The invention further concerns numerous other characteristic features which will become more apparent after perusal of the detailed description given below with reference to the appended drawings, in which:

FIGURE 2 illustrates, in a perspective view, a panel which is characteristic for building dismountable partitions to the present invention;

FIGURES 3, 4 and 5 are, respectively, sections by planes whose traces follow the straight lines III—III, IV—IV and V—V of FIGURE 2;

FIGURES 6, 7 and 8 illustrate, on a larger scale, the parts of panels indicated respectively by F6, F7 and F8 of FIGURE 2;

FIGURES 9 and 10 are, respectively, sections by planes whose traces follow the straight lines IX—IX, X—X of FIGURE 6;

FIGURE 11 is a cross-section by a plane whose trace follows the straight line XI—XI of FIGURE 7;

FIGURE 12 illustrates a section of the junction part between uprights and cross-pieces of a panel characteristic of the present invention;

FIGURE 13 illustrates a front view of part of a dismountable partition according to the present invention, whereby part of a joint cover is removed;

FIGURES 14, 15, 16 and 17 are, respectively, sections by planes whose traces follow the straight lines XIV—XIV, XV—XV, XVI—XVI and XVII—XVII of FIGURE 13;

FIGURES 18 and 19 are, on a larger scale, cross sections by planes whose traces follow the straight lines XVIII—XVIII and XIX—XIX of FIGURE 1;

FIGURE 20 is a cross section by a plane whose trace follows the straight line XX—XX of FIGURE 19;

Figure 1:
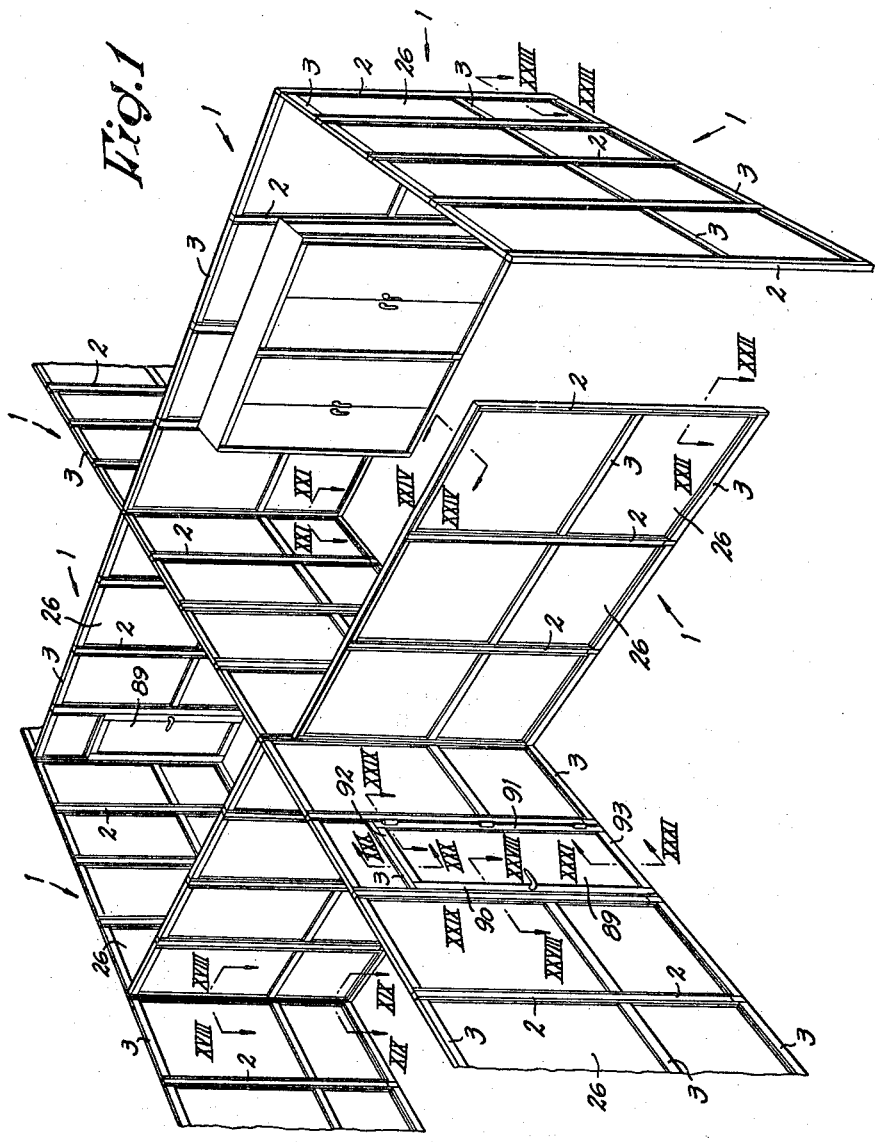
FIGURE 1 shows diagrammatically dismountable partitions applying the essential features of the present invention.

FIGURES 21, 22, 23 and 24 respectively are, on a larger scale, sections by planes following the straight lines, XXI—XXI, XXII—XXII, XXIII—XXIII and XXIV—XXIV of FIGURE 1;

FIGURE 25 illustrates a cross-section of a characteristic assembly part between the uprights and joint-covers of a resistance structure;

FIGURE 26 illustrates a cross-section of an assembly for loose elements fastened onto dismountable partitions according to the present invention;

FIGURE 27 is a cross-section by a plane whose trace follows the straight line XXVII—XXVII of FIGURE 26;

FIGURES 28, 29, 30 and 31 are, respectively, sections by planes whose traces follow the straight lines XXVIII—XXVIII, XXIX—XXIX, XXX—XXX, XXXI—XXXI of FIGURE 1.

The essential element of the present invention consists of a new type of self-supporting panel 1 which, as illustrated by way of example in FIGURES 1 to 11, is practically made of a frame and either translucent or opaque filling panels.

This frame is characteristic by the fact that it comprises, along both lateral edges, a special section 2. These sections are assembled by cross-pieces 3 which are designed according to the nature and the number of filling panels.

Aforesaid sections 2 are characteristic by the fact that they have a cross-section which is clearly illustrated for instance in FIGURES 4, 5, 9, 15, 16, 17, 18, 19, 21, 22 and 23. They are also characteristic by the fact that their cross-section is in general practically of U-shape and that they have on either side a pair of ribs.

The side faces 4–5 of aforesaid U part are, along their free end, terminated by a gripping rib 6–7 respectively. The inner ribs 8–9 themselves are, toward their free end, folded toward the inside in order to form gripping edges 10–11 respectively, whereby the gripping elements 6–7–10–11 are disposed in the same plane. The outer ribs 12–13 are, along their free edge, terminated by an outer gripping rib 14–15 respectively and an internal gripping rib 16–17 respectively. Aforesaid side faces 4–5 of the section are extended in opposite direction to their gripping ribs 6–7 so as to provide two contact ribs 18–19 respectively, terminated by a face with a 45° slant.

The second characteristic element of the panels consists of the cross-pieces. The latter are made of special sections which are adapted to the various designs, i.e. according to whether there are double-walled partitions, single-walled partitions or mixed partitions, i.e. consisting of a single-walled part and a double-walled part. These cross-pieces are caisson- or box-shaped of generally prismatic form and have on two opposite faces, either a median inlet, or two terminal inlets, or, on one face a median inlet and on the other face two terminal inlets.

The sections of the second and third types are mainly illustrated in FIGURE 3.

In the embodiments which are shown, aforesaid box-type sections 3 have such inlets 20, median or terminal. Preferably, and as shown diagrammatically, these inlets 20 will be edged by gripping ribs 21–22 respectively, to make it easy to fasten thereonto some seal, either elastic or of plastics.

Whichever be the cross-section of the cross-pieces 3 which are being used, care should be taken that the distance D between two terminal inlets 20 be practically equal to the distance D1 between the two inner ribs 8–9 (FIGURES 3 and 4).

The third characteristic element of the panel is an assembling element 23 (FIGURE 12), formed in the present instance by a length of rod with a characteristic cross-section in H-form whose width D2 is practically equal to aforementioned distances D and D1 and whose height $d$ is equal to the internal distance $d1$ of the cross-pieces 3. Moreover, the distance $d2$ and the height $d3$ of the branches of aforesaid section 23 are practically equal to the width D3 and the height $d4$ respectively of the median inlet 20 (FIGURES 3, 4 and 12).

Aforesaid junction piece 23 is provided with tapped holes 24–25 at right angles.

The assembly, in the workshop, of panels forming the dismountable partitions according to the present invention, is extremely easy, fast and economical, whether it be a double-walled panel, a single-walled panel or a mixed panel.

The assembly of a double-walled panel requires the use of two uprights 2, at least two cross-pieces 3 of the type with two terminal inlets, of four junction pieces 23, and of boards or plates 26 which can be either opaque or transparent or made of some filling material 27.

The assembly is carried out in the following way: a start is made with uprights 2 of the type which has been described above, to which are then fastened two cross-pieces 3. The actual fastening is performed by means of an element 23 attached on the one hand, to the uprights 2 by a screw 28 and, on the other hand, to the cross-piece 3 by at least one screw 29. The walls 26 and, may be, the filling material 27 are engaged with the open frame which has thus been prepared. At the end of both cross-pieces 3 aforesaid junction elements 23 are fastened by means of the same screws 29 and, finally, onto the end parts which protrude beyond aforesaid junction elements 23 as well as on the outer edge of aforesaid walls 26, the second upright 2 is engaged and fastened onto aforesaid junction element 23 by screws 28. The same kind of assembly might of course be carried out by starting with an open frame consisting of two uprights 2 and one cross-piece 3.

It is possible to proceed in a similar manner for making a single-walled panel of this kind, but by making the following arrangements: as illustrated more particularly in FIGURE 4; together with each one of the two uprights 2, use will be made of an intermediate section 30 mainly consisting of a core 31 designed so as to have a median inlet 32 of the type which was described above, and having moreover, toward the two longitudinal edges, a rib 33 whose free end is straightened outward so as to form a gripping edge 34. This section 30 is such that it can engage with a sliding fit onto such upright 2 by being hooked to the latter and forming, so to say, a median inlet 32 which is necessary for subsequently making a single-walled panel. This special section 30 will automatically be clamped between two cross-pieces.

For making a panel of this kind, it will thus suffice to start with two uprights which have thus been completed, and to fasten them at one end by means of a cross-piece 3 having a median inlet, as previously explained, and which is moreover disposed in the same plane as aforesaid median inlet 32 of the uprights.

But all the same, the fastening of the junction elements 23 onto aforesaid cross-piece will take place by means of at least one screw 35 (FIGURE 10), engaged into the bottom of aforesaid median inlet 20 and into aforesaid tapped hole 24 of aforesaid junction piece. These precautions having duly been observed, the assembly is similar to that which has been described in connection with the double-walled panel.

Finally, for assembling a mixed panel, such as that which is illustrated in FIGURES 2 to 11, use will be made of the same means according to whether one deals with the double-walled part of the panel or with the single-walled part thereof. It is also possible to make panels with one or several intermediate cross-pieces in order to fasten into one and the same panel either only double walls, or only single walls, or both at the same time. All these forms of embodiment are made by the same assembly means but by making a proper choice of the sections, as described above.

It will thus be possible, in the workshop, to prepare all the panels which are needed for building any kind of partition, and more especially in accordance with the intended designs.

It will be noted that, technically speaking, the panels are the same for all parts of a project if, of course, due account is taken of the dimensions and of the glazed or opaque parts as well as of the opening parts.

According to one essential characteristic of the present invention, the panels which have thus been prepared are transported on the site and fitted into place without previous fastening of a rigid framework, the mutual assembly of aforesaid panels automatically creating the latter. With this purpose in view, use is being made of special elements for the mutual fastening of at least two neighbouring uprights of adjacent panels, whereby these uprights may either be disposed in parallel planes or in planes which are at right angles to each other. The same disposition can be applied for fastening together more than two panels, for instance three or four panels, so that any type of junction whatever can be obtained and that it is thus possible to make all and sundry assemblies of a project by similar means. This special junction part 36 mainly consists of a U-shaped clamp whose two side branches are bent outward so as to form two notches 37–38 the outer boundaries of which are ribs 39–40 respectively. The latter are such that they may fit into longitudinal grooves delimited in the uprights by the outer ribs 14-15. Moreover, the overall width L of aforesaid elements 36 is determined by the spacing of two parallel uprights adjacent to a partition, while the space E is determined in accordance with the position of aforesaid external ribs 12-13.

Centrally, aforesaid element 36 is traversed by a hole 41. Moreover aforesaid element 36 is also characterized by two internal jambs 42-43 whose position, shape and dimensions are determined by the shape, position and dimensions of aforesaid external ribs 14-16 and 15-17.

The assembly of dismountable partitions according to the present invention by means of aforesaid panels 1 and aforesaid assembly elements 36 is being done in the following way, after the proper type of wainscoting 44 and of the batten 45, by means of which the partition will rest against the ceiling, has been duly chosen: In the present instance, the type of wainscoting 44 is not described, considering that use can be made of any arrangement by means of which it will be possible to provide the partitions with a seat of adequate stability and to give rise in the partition to a vertical thrust capable of maintaining aforesaid partition firmly against floor and ceiling. In this respect, it will anyway be preferable to make use of the very particular type of adjustable wainscoting which is the object of another patent application filed on behalf of applicant.

By way of upper bearing 45, as illustrated diagrammatically in the cross-section of FIGURE 14, use can be made of simple joints of elastic material or of plastics 46-47 engaged into the extreme upper inlets of the upper cross-piece 3.

For assembling two panels disposed in the same plane, whether they are single-walled as illustrated in FIGURES 15 and 16, or double-walled as illustrated in FIGURE 17, the procedure is as foolws: at a convenient distance along the uprights 2, for instance at a distance of the order of 60 cm., each time a pair of clamps 36 will be placed acting at the same time and on either side onto the external ribs of the uprights 2, whereby aforesaid clamps are firmly tightened by bolts 48 going through coaxial openings 41 of each pair of clamps and being engaged by an appropriate nut 49. In this manner is automatically formed, by the very assembly of adjacent panels, the rigid framework which, in the present instance, has the general shape of a kind of latticed column. The head of bolt 48 as well as nut 49 will preferably be shaped so as to make possible the fastening of joint covers by clasping. Each joint-cover consists of a strip 50 provided with clasping holdfasts or clasping ribs 51-52. After aforesaid joint-covers, in the present instance two parallel mutually opposite joint-covers, have been applied, there are formed in the actual partition, tubular or box-shaped posts of great stability which are completely closed.

For making a T-shaped assembly as illustrated in FIGURES 18, 19 and 20, the work will be carried out in two separate phases. In fact, the two panels disposed in the same plane will be assembled exactly as has been described above. For assembling the third panel, which is at right angles to the plane of the two others, the procedure will be as follows: at certain locations and mainly at least near the top and the bottom of the partition, a clamp 36 will be combined with a long bolt 53 engaging a nut 54 which, in turn, is engaged in such a way that it cannot rotate in the longitudinal groove delimited by the two external ribs 12-16 and 13-17 of the adjacent upright to the third panel to be assembled. The head of aforesaid bolt 53 will make it possible to clip subsequently the joint-cover 50-51-52 as indicated before. In one particular form of embodiment, and mainly for making things easy, nut 54 will be made of a very special form such as indicated in FIGURE 20. This form is mainly rectangular with two rounded diagonally opposed apices, whereby the width $a$ of aforesaid nut is less than the distance $a1$ between the two ribs 16-17 and the length $b$ of aforesaid nut 54 is larger than aforesaid width $a1$, but smaller than or equal to the distance $b1$ between the inner faces of both ribs 12-13. In this way, these nuts 54 can be fitted directly into place in the uprights without any need for making them slide along the whole height of the upright, an operation which, most of the time, would be hardly possible to perform on the site, namely when the partitions are already clamped between floor and ceiling.

Figure 21:
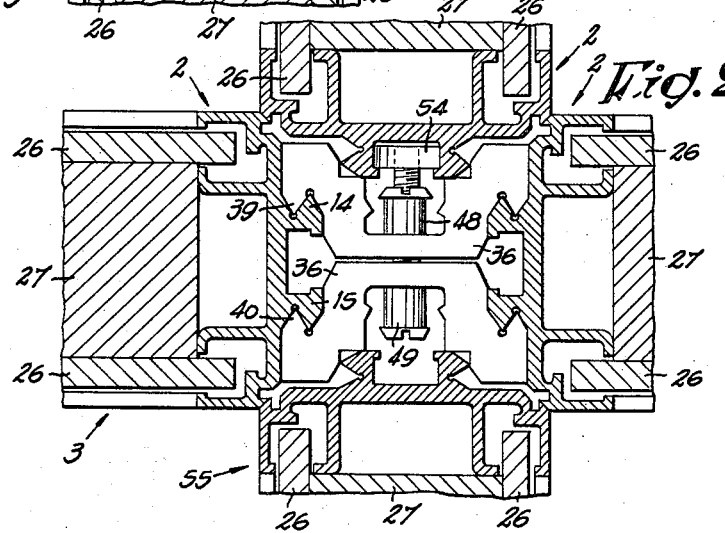

It is also possible, as shown in FIGURE 21, to make by the same means assemblies in cross-shape. In this case, the operation will begin by making a T-shaped assembly exactly as has just been described with respect to FIGURES 18 to 20.

Concerning the way of fixing the fourth partition, shown in the present instance at 55, the latter can either be held into place by means of a thrust, exerted for instance by means of jacks or other adequate means as may be available if aforesaid fourth partition 55 can be made to bear against a wall or other solid part. It would also be possible to exert this thrust by inserting into the caisson formed by the four adjacent uprights at least one pair of clamps 36 which may have been previously fastened together by a bolt 48 with nut 49 and offset 90° with respect to the clamps which fasten together the panels in one and the same plane.

Figure 22:
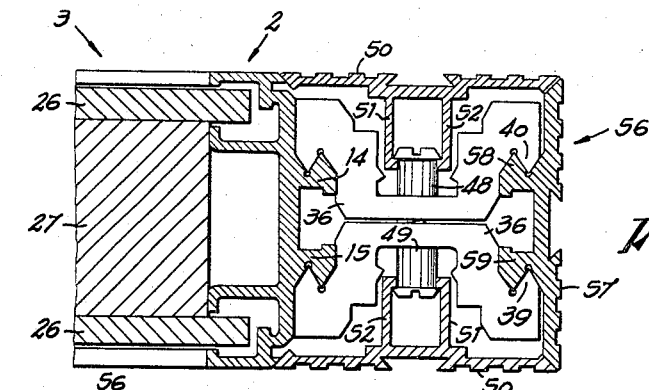
Figure 23:
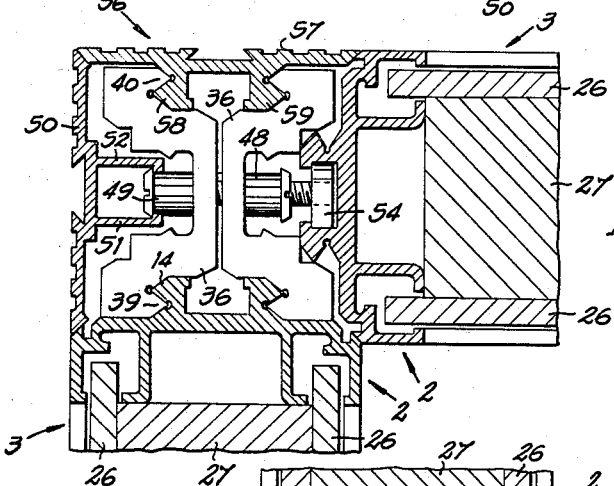

For making a visible terminal upright or for making a corner, as illustrated diagrammatically in FIGURES 22 and 23, use will be made of a special joint-cover which has a double function on account of the fact that, apart from its role as joint-cover, it must also provide the second gripping means of the assembly elements 36 opposed to the external gripping ribs 14-15 formed by the corresponding upright 2 of the panel. In the present instance, this joint-cover 56 consists of a strip 57 and of two internal ribs 58-59 whose dimensions and cross-section are identical to those of aforesaid outer ribs of the uprights 12-14-16 and 13-15-17 respectively. Thus, this joint-cover will fulfill, for the formation of the terminal post, the same function as an ordinary upright. So, with an extremely small number of duly standardized elements, it will not only be possible to prepare in the workshop all panels intended for any kind of partitioning work, but it will also be possible, on the site, to make any kind of assemblies either coplanar, in corner shape, crosswise, etc. with the same facility, ease and speed.

It is also possible to complete the partitioning by subsidiary dispositions which, in fact, are infinitely variable, but do not change anything in the actual invention, as such. So, for instance, for heading partitions which do not reach to the ceiling, and more particularly those whose top part is flexible (FIGURE 24), it is possible to fasten into the upper cross-piece 3 special sections 60 the shape and characteristics of which are variable and which could also be used for limiting any visible part of uprights 2, and namely at the height of the bays, boundary uprights or similar items.

Finally, according to another characteristic feature of the present invention, these same dismountable partitions can readily and economically be designed for applying and fastening to them any kind of loose elements such as shelves, sills, cupboards, shutters, doors and the like.

In order to fasten immovable elements such as sills, shelves, doors, etc., use will be made at the appropriate locations, of a special section consisting of aforesaid section 2 extended at least on one side by an appendage 61 (FIGURE 26), shaped so as to form, over the whole length or over part of the length of aforesaid element 2, a recess 62 having a narrowed inlet 63 delimited by two gripping ribs 64-65. In order to facilitate this gripping function, these ribs are edged, toward the inside of aforesaid recess 62, by a section of triangular cross-section which renders more easy the gripping into the fastening nuts.

As illustrated diagrammatically in FIGURES 26 and 27, this disposition makes it easy to fasten readily all appropriate elements, represented diagrammatically in 66, by simple bolts 67 and nuts 68 whose shape and dimensions are such that they are prevented from rotating when aforesaid bolts 67 are tightened.

The opening parts, such as the doors for instance, consist as usual of a fixed part, a jamb and the actual shutter. The fixed part consists of two uprights 2 and one cross-piece 3. The jamb is formed laterally by two identical special sections 69–70 engaged in the corresponding uprights 2 and, on top, by the bottom part of cross-piece 3.

These special sections are in general of L-shape, one branch of which is provided with gripping ribs 71–72 and 73–74 respectively, a median deformation 75–76 respectively, having a U-shaped cross-section whose two side branches comprise a gripping rib 77–78 and 79–80 respectively; these median deformations 75–76 are of such size that they can engage with an easy fit into the corresponding median part of the marginal sections 2 which delimit the corresponding part of the fixed part. The second wing of aforesaid sections 67–70 has a lengthwise groove 81–82 respectively, into which are engaged the sealing strips 83–84 respectively. In the section 69 is engaged the filling part 85 whose section is such that it forms at the same time the fixed catch 86 whereas, in section 70, are engaged and fastened by screws 87 the fixed elements 88 of the door hinges. On either side of these parts of the hinges 88 are engaged, into aforesaid section 70, lengths of filling rods.

The operating part or actual door 89 consists of a strong frame together with the single- or multi-walled filling panel. In the present instance, the frame consists of two uprights 90–91 and of two cross-pieces 92–93. Both uprights are identical and consist of a box-like section essentially characterized by the following features: a longitudinal jamb 94, a median groove 95 whose lateral parts are each provided with a gripping rib 95–97 respectively; at the corner opposite aforesaid jamb 94, there is a longitudinal inlet 98 into which is fastened the support 99 of a seal 100; on the opposite face which faces the inside of the door, one or two inlets for fastening the filling panel, in the present instance, two inlets 101–102 for engaging the corresponding part of the walls 103–104 respectively; inside aforesaid caisson, two pairs of mutually opposed ribs 105–106 and 107–108 respectively, as well as two equal and mutually opposite bearing ribs 109–110 respectively. In the upright 90 are fitted and/or fastened the support and the guide of the lock bolt or of any other locking device, key, crutch handle, door handle or suchlike and, on either side of this locking device, filling rods.

In the upright 91 are hooked and fastened by screws 112, the moving elements of the door hinges 113 which are to co-operate with aforesaid fixed hinge elements 88, on either side of the latter, are hooked the filling rods.

The cross-pieces 92–93 consist of box sections similar to those which are used for making the cross-pieces 3 of the partition. These box sections are essentially characterized by the following features: on each face, internal and external respectively, a median or two terminal inlets which, in the present instance comprise two end inlets, 114–115 and 116–117 respectively, two pairs of guiding faces 118–119 and 120–121, and two pairs of bearing ribs 122–123 and 124–125.

The assembly between aforesaid uprights 90–91 and the adjacent cross-pieces 92–93 is carried out by the known means of applying corner squares one branch of which is engaged in an upright, adjusted with a sliding fit between aforesaid ribs 105 to 110 and solidly fastened by screws, whereas the second branch is engaged in a cross-piece, adjusted therein with a sliding fit between the bearing faces 118 to 121 and the bearing ribs 122 to 125 and solidly fastened thereonto by screws.

By means of these various features, it will thus be quite easy, starting from one and the same type of partitions, to adapt the door 89 in such a manner that it may either open toward the inside or toward the outside and build as a left-hand door or right-hand door. In fact, for fulfilling either of those conditions, the work will always be started from the same fixed part and the same constituent elements of the jamb, whereby, however, the relative positions will be altered according to the required results.

For changing this disposition into a left-hand or right-hand door, opening toward the outside, it will be enough in either of these two aforementioned cases, to reverse the positions of the jamb, closing and hinge elements and to turn the door by 180°. These changes can, of course, be made quite easily and in a very short time.

For making a double door, the same elements and means will be used but with the addition of two special sections which are engaged and hooked into the side inlets 98 of the respective boxlike sections 90 forming the outer uprights of the framework of both leaves of aforesaid double door.

Similarly, for this double door, it will be possible to cause aforesaid leaves to open either toward the inside or toward the outside by simply inverting the parts such as has been described with respect to single doors.

It is obvious that the present invention is in no way limited to the forms of embodiment or strictly to the sections which have been described in detail and are illustrated in the appended drawings.

It is possible, in fact, to apply this novel technique by means of equivalent sections or also by means of coordinated sections, i.e., which allow a symmetrical disposition, respectively an inversion or interchangeability of the closing elements and the hinges so as to make it possible at the same time, starting from the same constituent elements, to make lefthand or righthand doors either toward the inside or the outside, or even of transforming the doors even after they have been fitted already in an existing partition.

In fact, it should be noticed that the technique of the present invention is based on the principle of making the partitions as well as all the auxiliary elements according to a so-called standard unit of length which latter is previously determined for each particular job.

As is more particularly indicated in FIGURES 18, 19 and 21, the interconnected panels are always perfectly aligned in the four directions of the unit.

There is thus on the one hand a possibility of preparing the panels in series adapted to the dimensions of the chosen unit and on the other hand to transpose them or to add identical new partition elements either in the same plane or in orthogonal planes.

The doors or other opening elements in the partition, whether made of wood or of metal sections are in turn mounted in a panel built to unit size, whereby their framework terminates on either side of a section 2 like an ordinary panel. On account of this fact, the door contained in a panel shares its extreme mobility. An ordinary panel can be replaced not only by another ordinary panel, but also by a panel containing a door, while a panel containing a door can be replaced by an ordinary panel. By disassembling the panel containing a door and by assembling it again after having turned it by 180°, a door which opened toward the inside can be made to open toward the outside, and vice versa.

In the same way it is possible to quickly replace a panel containing a door opening right hand by a panel containing a door opening left hand, and vice versa.

What I claim is:

1. A dismountable partition system adapted to receive panels, said system consisting of sets, each set comprising two uprights and at least two crosspieces, each of said uprights having a side surface with means adapted to receive a vertical edge of a panel, each of said uprights also having a profiled front surface with gripping ribs, each of said cross-piece being of a hollow prismatic shape and having a U-shaped inlet adapted to receive a horizontal edge of said panel, at least two assembling rods connecting said uprights with said cross-pieces and being H-shaped in cross section, each of said assembling rods extending through the hollow portion of a separate one of said prismatic cross piece and having two legs extending on opposite sides of the inlet of the cross-piece, means attaching an end of said assembling rods to said uprights, elongated clamps, each clamp having two opposed pairs of ribs, the ribs of each pair engaging the gripping ribs of a separate upright, and joint covers consisting of elongated strips and having means engaging said clamps.

2. A system in accordance with claim 1, wherein the side surfaces of said uprights are U-shaped and have side faces which are bent toward each other and inner ribs having outwardly bent gripping edges, whereby said side faces and said inner ribs form clamping grooves receiving said panels, the gripping ribs of the front surfaces of said uprights having outer parallel continuous end portions which are substantially triangular in cross section and which are adapted to engage said clamps.

3. A system in accordance with claim 2, wherein said outer parallel continuous end portions have inwardly extending continuations constituting small nut-receiving ribs.

4. A system in accordance with claim 2, further comprising an intermediate section fixed to said U-shaped side surfaces of the uprights and having a median reduced inlet for a panel.

5. A system in accordance with claim 2, wherein said clamps hold the upright in the same plane and engage said outer parallel continuous end portions, and screws tightening said clamps and fixing a plurality of said joint covers.

6. A system in accordance with calim 1, having two orthogonal uprights forming a corner, the last-mentioned upright being held by said clamps, and screws tightening said clamps and fixing a plurality of said joint covers.

7. A system in accordance with claim 1, comprising a structure having three joint covers, pairs of clamps and screws tightening said clamps, said clamps and said screws fixing said joint covers.

8. A system in accordance with claim 1, wherein the inlets of said cross-pieces are arranged in pairs in parallel planes.

9. A system in accordance with claim 1, wherein said cross-pieces have two inlets on one side and a single median longitudinal inlet on the opposite side.

10. A system in accordance with claim 1, wherein the inlets of said cross-pieces have space limiting parallel opposed portions.

11. A system in accordance with claim 1, wherein said assembling rods are carried upon parallel opposed inner surfaces of said cross-pieces.

12. A system in accordance with claim 11, having screws connecting said assembly rods to said cross-pieces.

References Cited

UNITED STATES PATENTS

| | | | |
|---|---|---|---|
| 2,013,043 | 9/1935 | Fox | 52—467 |
| 2,587,471 | 2/1952 | Hess | 287—189.36 |
| 2,962,133 | 11/1960 | Kirett | 52—584 X |
| 2,972,395 | 2/1961 | Peremi | 52—475 X |
| 3,173,179 | 3/1965 | Edwards | 52—731 X |

FOREIGN PATENTS

| | | |
|---|---|---|
| 451,781 | 1950 | Italy. |
| 1,188,647 | 1959 | France. |
| 1,231,738 | 1960 | France. |
| 622,073 | 1962 | Belgium. |

JOHN E. MURTAGH, *Primary Examiner.*